(12) United States Patent
Lee et al.

(10) Patent No.: US 8,423,884 B1
(45) Date of Patent: Apr. 16, 2013

(54) SYSTEM, METHOD AND COMPUTER READABLE STORAGE MEDIUM FOR STORING THE METHOD FOR OPERATING GRAPHIC USER INTERFACE

(75) Inventors: Po-Kuan Lee, Tainan (TW); Hui-Kuang Chung, Taipei (TW); Han-Chao Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 13/314,865

(22) Filed: Dec. 8, 2011

(30) Foreign Application Priority Data

Nov. 11, 2011 (TW) ............... 100141283 A (51) Int. Cl.
*G06F 17/00* (2006.01)
*G06F 13/00* (2006.01)

(52) U.S. Cl.
USPC ........... 715/214; 715/227; 715/848; 711/170; 711/E12.003

(58) Field of Classification Search .......... 715/200, 715/201, 204, 205, 227, 243, 273, 700, 738, 715/760, 762, 766, 767, 782, 848, 849, 850, 715/851, 202, 203, 214, 215, 867; 711/152, 711/170, 171, 172, 173, 209, 4, E12.003, 711/E12.081
See application file for complete search history.

(56) References Cited

U.S. PATENT DOCUMENTS

| | | | |
|---|---|---|---|
| 5,550,970 A | 8/1996 | Cline et al. | |
| 6,338,072 B1 * | 1/2002 | Durand et al. | 718/104 |
| 6,690,400 B1 | 2/2004 | Moayyad et al. | |
| 8,266,406 B2 * | 9/2012 | Kavuri | 711/170 |

* cited by examiner

*Primary Examiner* — Maikhanh Nguyen
(74) *Attorney, Agent, or Firm* — McClure, Qualey & Rodack, LLP (57) ABSTRACT

A method for operating a graphic user interface is provided. The operation method comprises the following steps. An N-dimensional physical machine resource entity is provided. A first OS system graphic object is generated in a specific resource column of each of N−1 resource plane. Resource graphic objects are generated to occupy one of the resource blocks of each of the resource columns besides the specific resource column. The first OS system graphic object is deformed to display a usage of a first resource and a specific resource, and the number of the resource graphic objects is changed to display a remaining amount of the first resource and the specific resource.

22 Claims, 10 Drawing Sheets

SYSTEM, METHOD AND COMPUTER READABLE STORAGE MEDIUM FOR STORING THE METHOD FOR OPERATING GRAPHIC USER INTERFACE

RELATED APPLICATIONS

This application claims priority to Taiwan Application Serial Number 100141283, filed Nov. 11, 2011, which is herein incorporated by reference.

BACKGROUND

1. Technical Field

The present invention relates to a graphic user interface technology. More particularly, the present invention relates to a graphic user interface, system, a method for operating the graphic user interface, and a computer readable storage medium for storing the method.

2. Description of Related Art

In the conventional technology, only one operating system can be executed on one physical machine. The hardware resource of the physical machine thus cannot be fully utilized. In order to improve the efficiency and availability of the hardware resource and applications, a virtualization technology is used to establish a virtual environment for running multiple virtual machines on the physical machine to fully utilize the hardware resource.

In a virtual system, the resource is needed to be adjusted according to the amount of data being processed. It is one of the most intuitive manners to adjust the resource of the virtual system through a graphic user interface. In a conventional graphic user interface, a user may adjust the amount of resource through an empty field, a pull down menu or an adjusting bar, wherein the empty field is used for inputting a value; the pull down menu is used for providing options; and the adjusting bar is used for adjusting values by moving the bar. However, a user still has to think before typing or selecting the correct values when one of the above methods is used, which is not intuitive and time-consuming for operation.

Accordingly, it is an issue desired to be resolved by those in this field regarding how to design a system and a method for operating a graphic user interface, and a computer readable storage medium to overcome the aforementioned problems.

SUMMARY

An aspect of the present disclosure is to provide a method for operating a graphic user interface. The method comprises the following steps. An N-dimensional physical machine resource entity is provided, wherein the N-dimensional physical machine resource entity comprises a first resource axis, N−1 resource axes and N−1 resource planes. The first resource axis is corresponding to a first resource. The N−1 resource axes are intersected with the first resource axis, and each of the N−1 resource axes is corresponding to a specific resource. Each of the N−1 resource planes is formed between the first resource axis and one of the N−1 resource axes. Each of the N−1 resource planes comprises a plurality of resource columns extending along an extension direction of the corresponding resource axes, and each of the of resource columns comprises a plurality of resource blocks, wherein the number of the resource columns is corresponding to a total amount of the first resource, and the number of the resource blocks of each of the resource columns is corresponding to a total amount of the specific resource. A first OS (operation system) graphic object is generated in the N-dimensional physical machine resource entity, wherein the first OS graphic object is disposed in a specific resource column of each of the N−1 resource plane to occupy a specific resource block. A plurality of resource graphic objects are generated to occupy one of the resource blocks of each of the resource columns other than the specific resource column. The first OS graphic object is deformed to display an amount of usage of the first resource and the specific resource such that the number of the resource graphic objects is changed to display a remaining amount of the first resource and the specific resource.

Another aspect of the present disclosure is to provide a system for operating a graphic user interface. The system comprises a storage unit, a display unit and a process unit. The storage unit stores an N-dimensional physical machine resource entity, wherein the N-dimensional physical machine resource entity comprises a first resource axis, N−1 resource axes and N−1 resource planes. The first resource axis is corresponding to a first resource. The N−1 resource axes are intersected with the first resource axis and each of the N−1 resource axes is corresponding to a specific resource. Each of the N−1 resource planes is formed between the first resource axis and one of the N−1 resource axes. Each of the N−1 resource planes comprises a plurality of resource columns extending along an extension direction of the corresponding resource axes, and each of the resource columns comprises a plurality of resource blocks, wherein the number of the resource columns is corresponding to a total amount of the first resource and the number of the resource blocks of each of the resource columns is corresponding to a total amount of the specific resource. The display unit displays the N-dimensional physical machine resource entity. The process unit is connected to the display unit and the storage unit for generating a first OS graphic object in a specific resource column of each of the N−1 resource plane to occupy a specific resource block; for generating a plurality of resource graphic objects to occupy one of the resource blocks of each of the resource columns other than the specific resource column, and for deforming the first OS graphic object to display an amount of usage of the first resource and the specific resource such that the number of the resource graphic objects is changed to display a remaining amount of the first resource and the specific resource.

Yet another aspect of the present disclosure is to provide a computer readable storage medium to store a computer program to execute a method for operating a graphic user interface, the method comprises the steps outlined below. An N-dimensional physical machine resource entity is provided, wherein the N-dimensional physical machine resource entity comprises a first resource axis, N−1 resource axes and N−1 resource planes. The first resource axis is corresponding to a first resource. The N−1 resource axes are intersected with the first resource axis and each of the N−1 resource axes is corresponding to a specific resource. Each of the N−1 resource planes is formed between the first resource axis and one of the N−1 resource axes. Each of the N−1 resource planes comprises a plurality of resource columns extending along an extension direction of the corresponding resource axes, and each of the resource columns comprises a plurality of resource blocks, wherein the number of the resource columns is corresponding to a total amount of the first resource and the number of the resource blocks of each of the resource columns is corresponding to a total amount of the specific resource. A first OS (operation system) graphic object is generated in the N-dimensional physical machine resource entity, wherein the first OS graphic object is disposed in a specific resource column of each of the N−1 resource plane to occupy a specific resource block. A plurality of resource graphic objects are generated to occupy one of the resource blocks of each of the resource columns other than the specific resource column. The first OS graphic object is deformed to display an amount of usage of the first resource and the specific resource such that the number of the resource graphic objects is changed to display a remaining amount of the first resource and the specific resource.

Further another aspect of the present disclosure is to provide a graphic user interface. The graphic user interface comprises an N-dimensional physical machine resource entity, a first OS graphic object and a plurality of resource graphic objects. The N-dimensional physical machine resource entity comprises a first resource axis, N−1 resource axes and N−1 resource planes. The first resource axis is corresponding to a first resource. The N−1 resource axes are intersected with the first resource axis and each of the N−1 resource axes is corresponding to a specific resource. Each of the N−1 resource planes is formed between the first resource axis and one of the N−1 resource axes. Each of the N−1 resource planes comprises a plurality of resource columns extending along an extension direction of the corresponding resource axes, and each of the resource columns comprises a plurality of resource blocks, wherein the number of the resource columns is corresponding to a total amount of the first resource and the number of the resource blocks of each of the resource columns is corresponding to a total amount of the specific resource. The first OS (operation system) graphic object is generated in the N-dimensional physical machine resource entity, wherein the first OS graphic object is disposed in a specific resource column of each of the N−1 resource plane to occupy a specific resource block. The resource graphic objects are generated to occupy one of the resource blocks of each of the resource columns other than the specific resource column. When the first OS graphic object is deformed to display an amount of usage of the first resource and the specific resource, the number of the resource graphic objects is changed to display a remaining amount of the first resource and the specific resource.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1A:
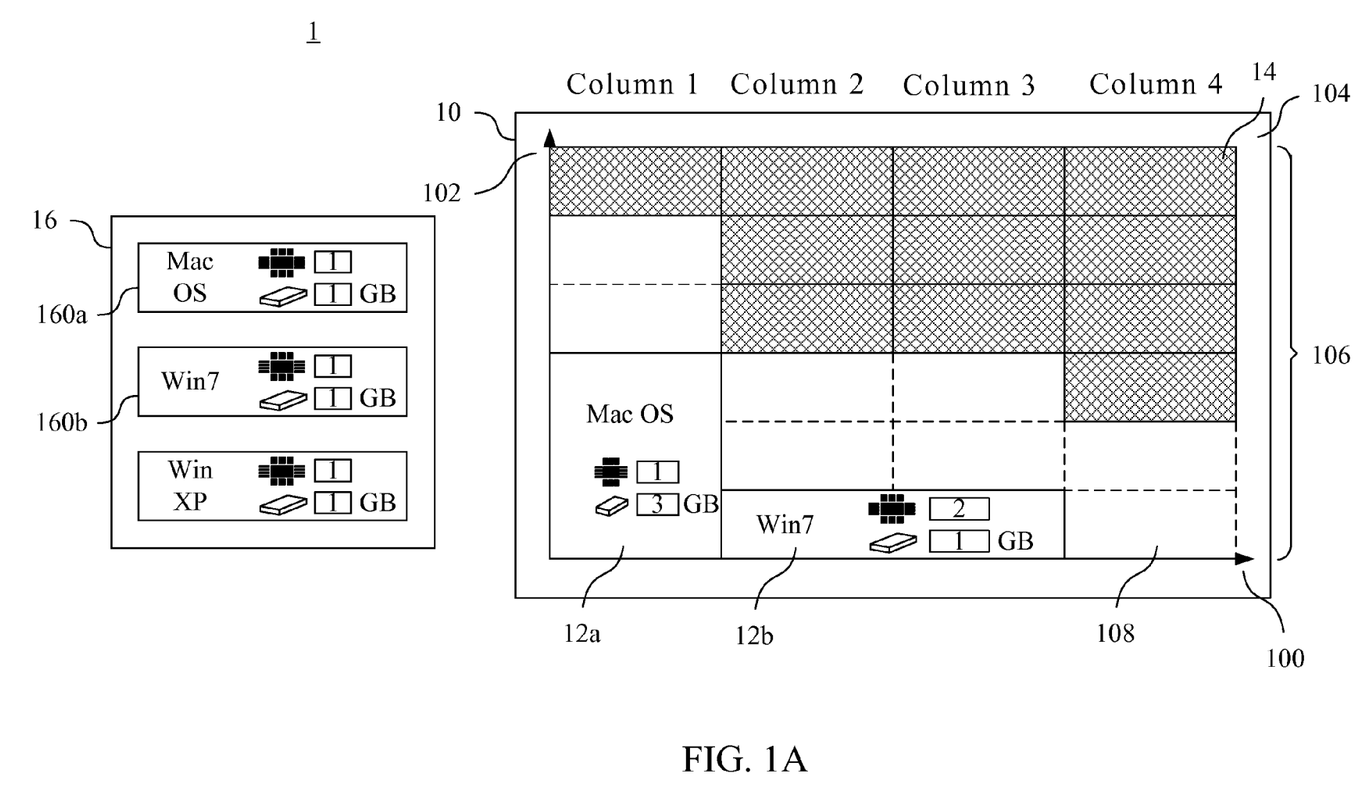
FIG. 1A is a schematic diagram of a graphic user interface according to an embodiment of the present disclosure.
Figure 1B:
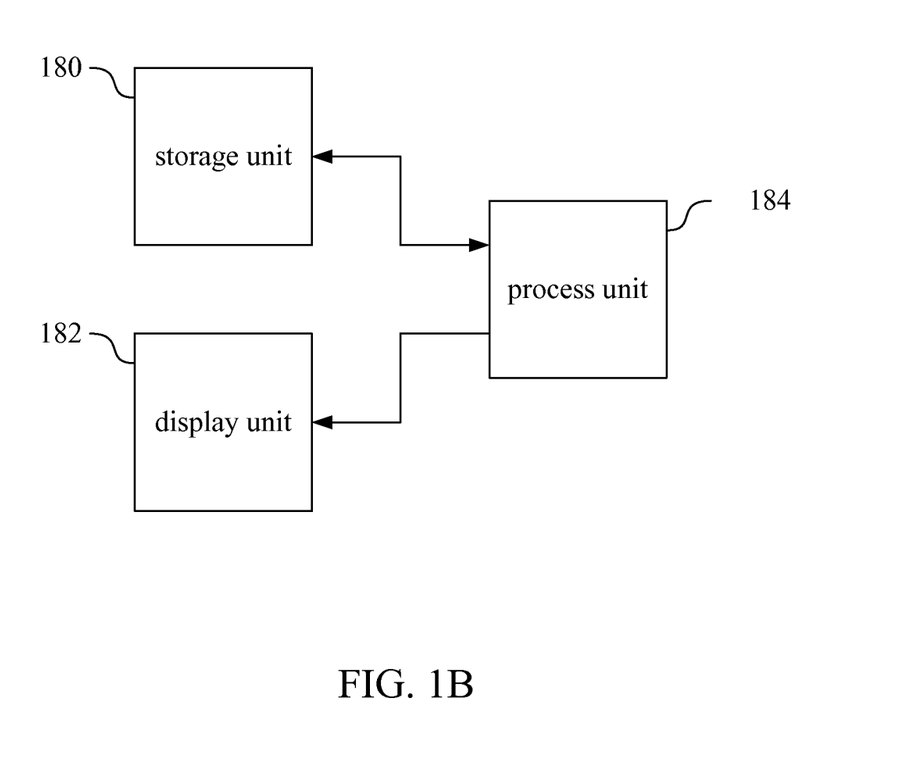
FIG. 1B is a block diagram of a system for operating the graphic user interface depicted in FIG. 1 according to an embodiment of the present disclosure.

FIG. 1A is a schematic diagram of a graphic user interface 1 according to an embodiment of the present disclosure. FIG. 1B is a block diagram of a system for operating the graphic user interface 1 depicted in FIG. 1A according to an embodiment of the present disclosure. The graphic user interface 1 comprises an N-dimensional physical machine resource entity 10, first OS graphic objects 12a and 12b, resource graphic objects 14 and an operation system list area 16. The system for operating the graphic user interface 1 comprises a storage unit 180, a display unit 182 and a process unit 184.

The process unit 184 is connected to the storage unit 180 and the display unit 182. The storage unit 180 stores the N-dimensional physical machine resource entity 10. In the present embodiment, the N-dimensional physical machine resource entity 10 is substantially a two-dimensional physical machine resource entity that is stored in the storage unit 180. The process unit 184 is able to retrieve the N-dimensional physical machine resource entity 10 and display the N-dimensional physical machine resource entity 10 on the display unit 182. The N-dimensional physical machine resource entity 10 comprises a first resource axis 100, N−1 resource axes 102 intersected with the first resource axis 100 and N−1 resource planes 104. It is noted that the N-dimensional physical machine resource entity 10 in the present embodiment is two-dimensional. Therefore, the two-dimensional physical machine resource substantially comprises one resource axis 102 and one resource plane 104. The resource plane 104 is formed between the first resource axis 100 and the resource axis 102. In the present embodiment, the first resource axis 100 and the resource axis 102 are vertical to each other such that it is more intuitive for the user to perceive.

The resource plane 104 comprises a plurality of resource columns 106 extending along an extension direction of the resource axis 102. Each of the resource columns 106 comprises a plurality of resource blocks 108. The number of the resource columns 106 is corresponding to a total amount of a first resource and the number of the resource blocks 108 of each of the resource columns 106 is corresponding to a total amount of a specific resource. For example, the first resource is a central processing unit (CPU) and the specific resource is a hard disk. In other embodiments, the first resource and the specific resource can be other types of resource such as a network bandwidth resource or a memory. Taking the information shown in the graphic user interface 1 in FIG. 1A as an example, the total amount of the resource available in the system comprises four central processing units and 6 GB of hard disk.

As shown in FIG. 1A, when the second OS graphic objects 160a and 160b in the operation system list area 16 are dragged to the N-dimensional physical machine resource entity 10, the process unit 184 generates the first OS graphic objects 12a and 12b in the N-dimensional physical machine resource entity 10, and displays the N-dimensional physical machine resource entity 10 on the display unit 182. The second OS graphic objects 160a and 160b can be dragged by using an input unit (not shown) of the system. The operation system list area 16 can comprise different types of second OS graphic objects each of which is corresponding to a specific operation system. Hence, in the present embodiment, the system can provide the resources of at most four central processing units and at most 6 GB of hard disk.

In the present embodiment, the N-dimensional physical machine resource entity 10 comprises two first OS graphic objects 12a and 12b corresponding to two virtual machines having the operation system of MacOS® and Win7® respectively. It is noted that the operation system MacOS® and Win7® are merely two examples. In other embodiments, other kinds of operation systems can be used as well. In the present embodiment, the resource of the first OS graphic objects 12a generated from the second OS graphic objects 160a comprises one central processing unit and a hard disk capacity of 3 GB. The resource of the first OS graphic objects 12b generated from the second OS graphic objects 160b comprises two central processing units and a hard disk capacity of 1 GB. Accordingly, the first OS graphic objects 12a occupies one specific resource column 106 (depicted as column 1 in FIG. 1A) since it comprises one central processing unit. The first OS graphic objects 12b occupies two specific resource columns 106 (depicted as column 2 and column 3 in FIG. 1A) since it comprises two central processing units.

On the other hand, resource graphic objects 14 are generated to occupy three resource blocks 108 of each of the resource columns (columns 2-4 in FIG. 1A) other than the specific resource column (column 1 in FIG. 1A) occupied by the first OS graphic objects 12a since the first OS graphic objects 12a comprises 3 GB of the hard disk capacity. Further, resource graphic objects 14 are generated to occupy one resource block 108 of each of the resource columns (columns 1 and 4 in FIG. 1A) other than the specific resource column (columns 2-3 in FIG. 1A) occupied by the first OS graphic objects 12b since the first OS graphic objects 12b comprises 1 GB of the hard disk capacity. Consequently, there is one resource graphic object 14 that occupies one of the resource blocks 108 in column 1. Each of the columns 2 and 3 comprises three resource graphic objects 14 that occupy the resource blocks 108 in the corresponding column. Column 4 comprises four resource graphic objects 14 that occupy the resource blocks 108 in the corresponding column. The resource of the whole system can only supply one more first OS graphic object and this first OS graphic object (i.e. one virtual machine) can only have one central processing unit and 2 GB of hard disk at most. In an embodiment, the amount of the usage of the first resource and the specific resource can not only be displayed by the graphic blocks mentioned above, but also be displayed as numeric values in the first OS graphic objects 12a and 12b.

Figure 2:
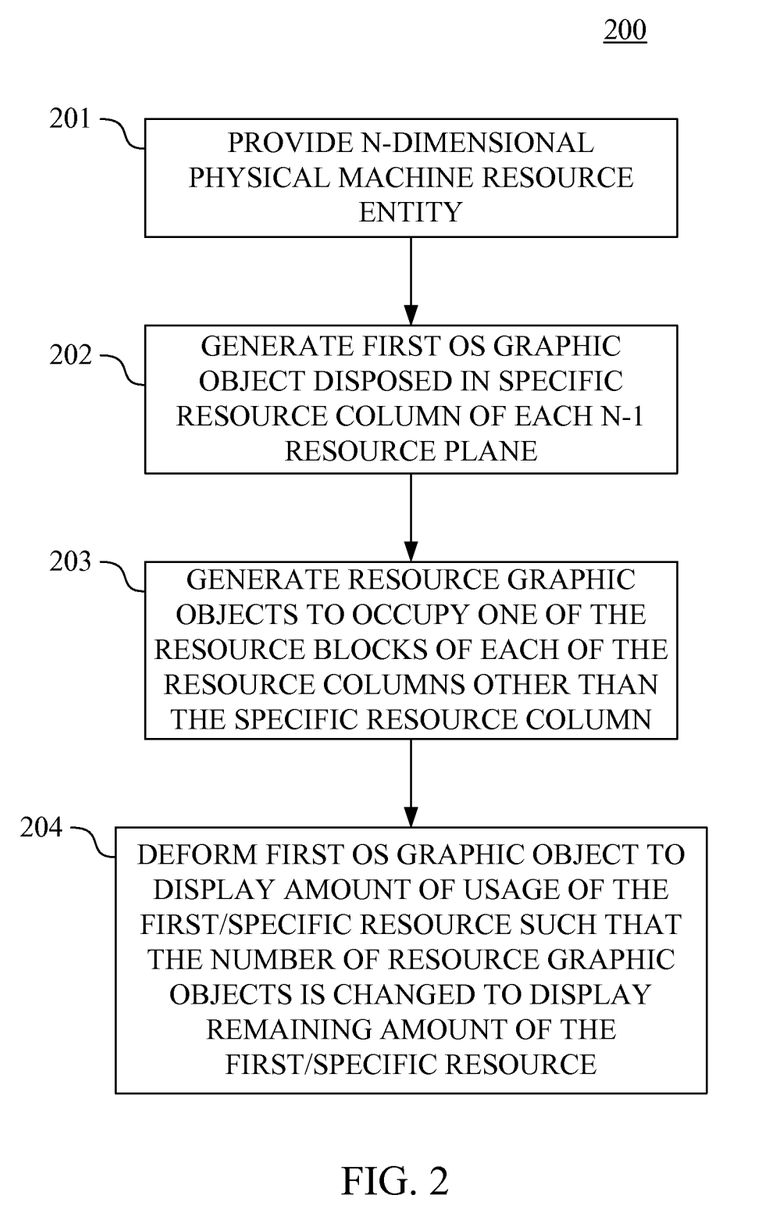
FIG. 2 is a flow chart showing a method for operating a graphic user interface in an embodiment of the present disclosure.

FIG. 2 is a flow chart showing a method 200 for operating a graphic user interface according to an embodiment of the present disclosure. FIG. 3A to FIG. 3D are diagrams of the N-dimensional physical machine resource entity 10 in the graphic user interface 1 showing the status of the N-dimensional physical machine resource entity 10 in different steps of the method 200. The method 200 comprises the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the storage unit 180 provides the N-dimensional physical machine resource entity 10 and the display unit 182 displays the N-dimensional physical machine resource entity 10 after the processing of the process unit 184.

Figure 3A:
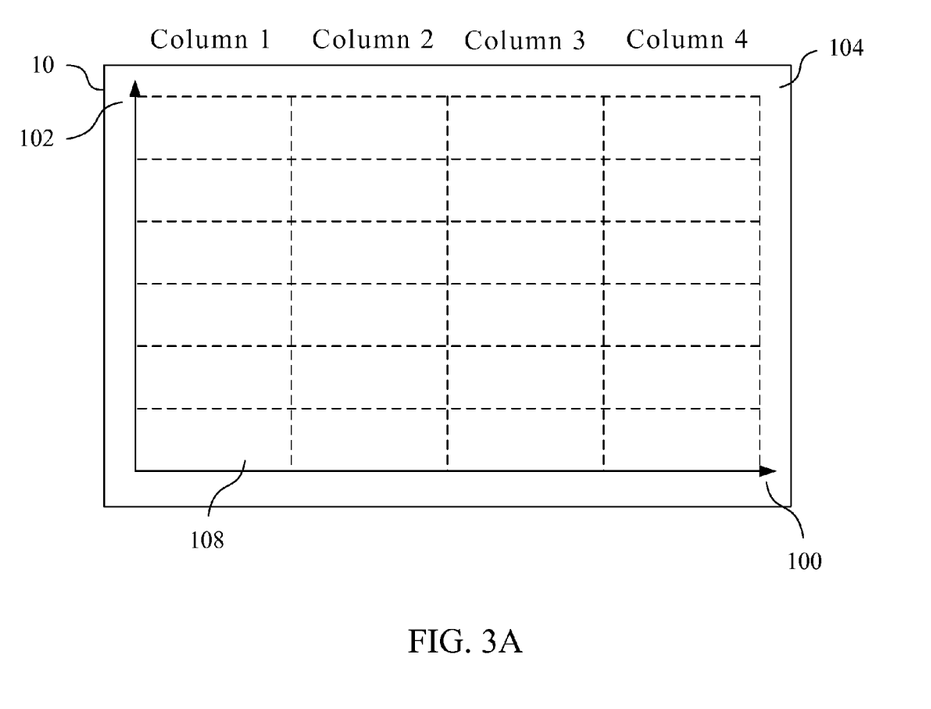
FIG. 3A to FIG. 3D are schematic diagrams of the N-dimensional physical machine resource entity for showing the statuses of the N-dimensional physical machine resource entity in different steps of the method shown in FIG. 2.

FIG. 3A is a schematic diagram of the N-dimensional physical machine resource entity 10 when the resources of the N-dimensional physical machine resource entity 10 are not used. Hence, the N-dimensional physical machine resource entity 10 depicted in FIG. 3A is empty. The resource blocks 108 are not occupied.

Figure 3B:
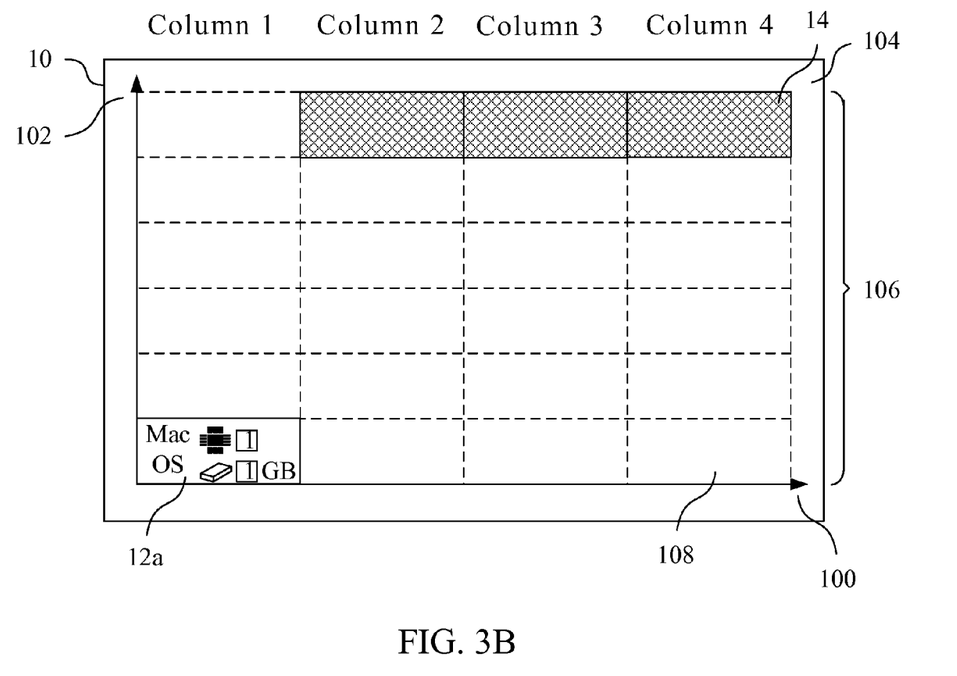

The process unit 184 generates the first OS graphic object 12a in step 202, as shown in FIG. 3B. In an embodiment, the first OS graphic object 12a is generated by dragging the second OS graphic object 16a from outside the N-dimensional physical machine resource entity 10 to the N-dimensional physical machine resource entity 10. The first OS graphic object 12a is generated on the resource plane 104 to initialize a virtual machine and the resource corresponding to the virtual machine. In the present embodiment, the second OS graphic object 16a is disposed in the operation system list area 16 as shown in FIG. 1A. The first OS graphic object 12a further occupies a specific resource block of a specific resource column (column 1 in the present embodiment) of the resource columns 106 of the resource plane 104.

The process unit 184 generates resource graphic objects 14 in step 203. The resource graphic objects 14 are formed in the resource columns other than the specific resource column, i.e. columns 2-4. One of the resource blocks of each of the columns 2-4 is occupied by one resource graphic object 14 respectively.

Figure 3C:
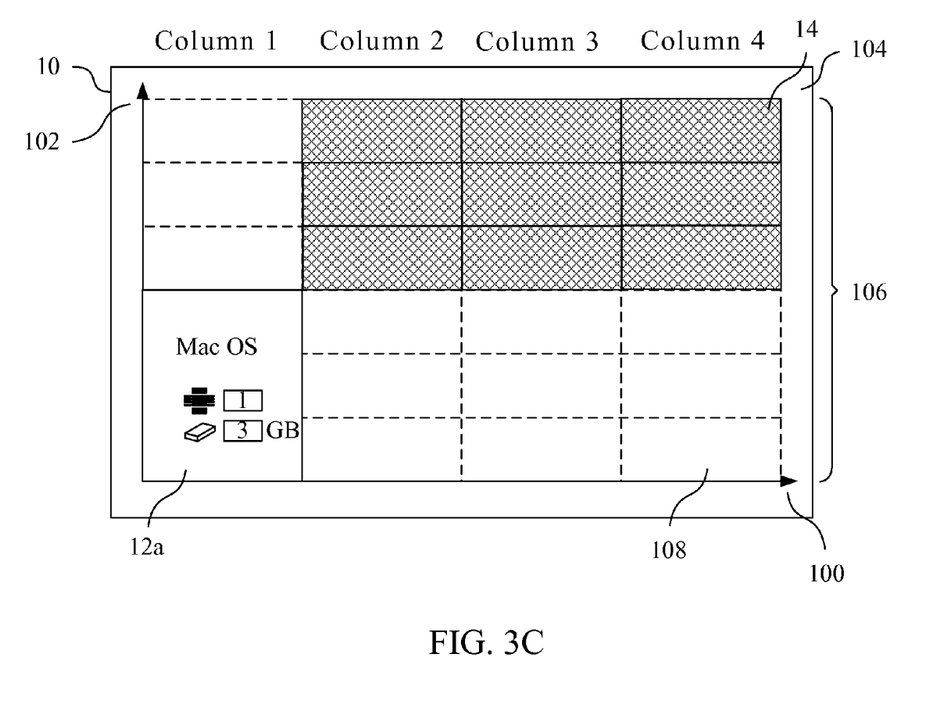

The process unit 184 deforms the first OS graphic object 12a in step 204 to make the display unit 182 display an amount of usage of the first resource and the specific resource such that the number of the resource graphic objects 14 is changed to display a remaining amount of the first resource and the specific resource, as shown in FIG. 3C. In an embodiment, the deformation of the first OS graphic object 12a is performed through the use of an input unit of the system.

For example, the first OS graphic object 12a is stretched or shortened in the specific resource column on one of the N−1 resource planes 104 along the extension direction of the corresponding resource axis such that the first OS graphic object 12a occupies M resource blocks, the number of the resource graphic objects 14 is changed to occupy M resource blocks 108 of each of the resource columns other than the specific resource column, wherein M is larger than or equal to one. In the present embodiment, the first OS graphic object 12a is stretched to occupy three resource blocks. Hence, the number of the resource graphic objects 14 is changed to occupy three resource blocks 108 of each of the resource columns (columns 2-4) other than the specific resource column (column 1 that is occupied by the first OS graphic object 12a). Consequently, after the deformation, it is known that the virtual machine corresponding to the first OS graphic object 12a utilizes 3 GB of the hard disk. There is 3 GB of the hard disk capacity that remains unused. Further, the amount of usage of the first resource and the specific resource can be displayed as numeric values in the first OS graphic object 12a.

Figure 3D:
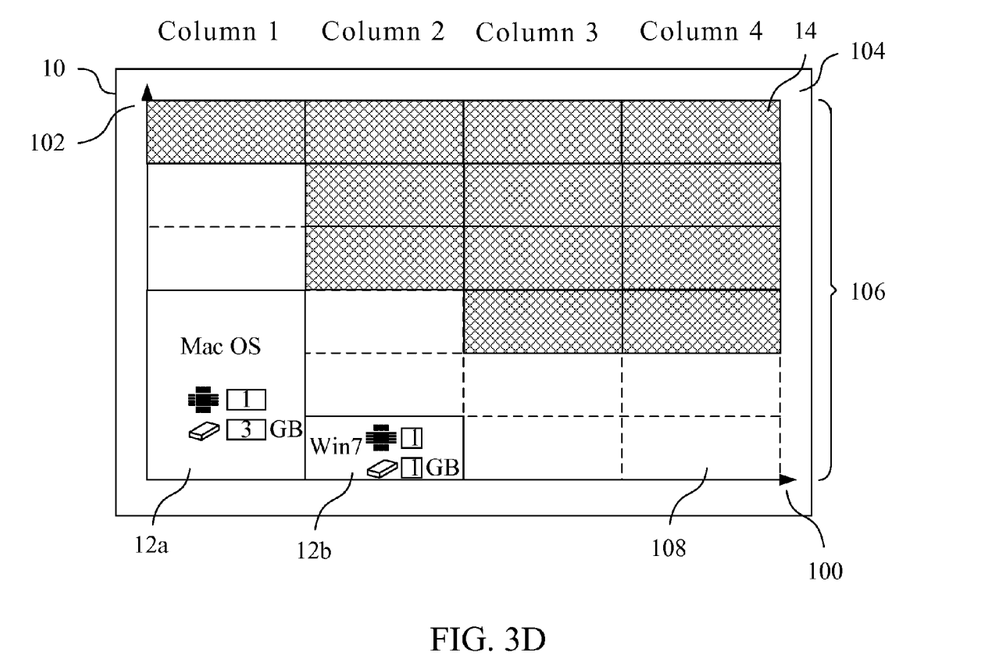

FIG. 3D is a schematic diagram of the N-dimensional physical machine resource entity 10 when steps 202 and 203 are repeated such that the second OS graphic object 160b is dragged from outside the N-dimensional physical machine resource entity 10 to the N-dimensional physical machine resource entity 10, so as to generate the first OS graphic object 12b in column 2 of the N-dimensional physical machine resource entity 10 shown on the display unit 182 after the processing of the process unit 184. Therefore, the resource graphic objects 14 corresponding to the first OS graphic object 12b are further generated to occupy one resource block 108 of each of the resource columns 1, 3 and 4.

If step 204 is performed again, the process unit 184 deforms the first OS graphic object 12b to make the first OS graphic object 12a stretched along a first extension direction of the first resource axis to occupy P resource columns of each of the N−1 resource planes 104, such that each of the P−1 resource columns other than the specific resource column has the same number of the resource blocks as the number of the resource blocks of the specific resource column, wherein P is larger than or equal to one. In the present embodiment, the first OS graphic object 12b is stretched along the first extension direction of the firs resource axis to occupy two resource columns, so as to make each of the resource columns (i.e. the newly occupied column 3) other than the specific resource column (i.e. column 2) has the same number of the resource blocks 14 as the number of the resource blocks of the specific resource column. The final result of the deformation of the first OS graphic objects 12a and 12b of the N-dimensional physical machine resource entity 10 is shown in FIG. 1A. Accordingly, after the deformation of the first OS graphic object 12b, the virtual machine corresponding to the first OS graphic objects 12b utilizes two central processing units. There is still one central processing unit that remains unused. Furthermore, the amount of the usage of the first resource and the specific resource can be displayed as numeric values in the first OS graphic object 12b.

When the first OS graphic object is shortened, the steps in the process depicted in FIG. 2 can be applied as well to release the resources utilized by the first OS graphic object.

In other embodiments, the graphic user interface 1 may comprise other N-dimensional physical machine resource entities. The first OS graphic object can be dragged from one of the N-dimensional physical machine resource entities to another one of the N-dimensional physical machine resource entities. When the first OS graphic object of the N-dimensional physical machine resource entity is dragged to outside the N-dimensional physical machine resource entity, the resource graphic objects corresponding to the first OS graphic object are removed. The resources utilized by the first OS graphic object are released as well.

Figure 4:
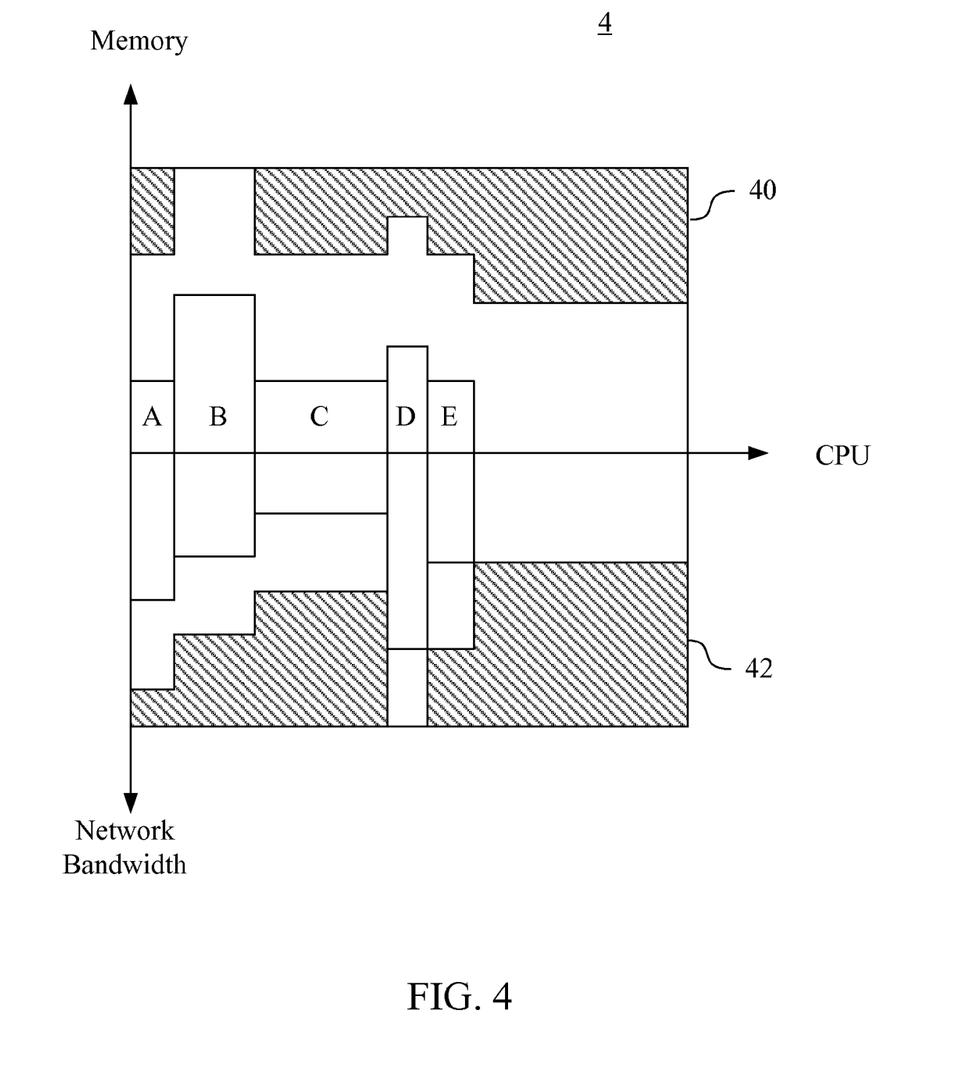
FIG. 4 is a schematic diagram of a three-dimensional physical machine resource entity according to an embodiment of the present disclosure

In the above embodiment, the N-dimensional physical machine resource entity is a two-dimensional physical machine resource entity. FIG. 4 is a schematic diagram of a three-dimensional physical machine resource entity 4 according to an embodiment of the present disclosure. The three-dimensional physical machine resource entity 4 comprises a first resource axis corresponding to a central processing unit and two resource axes that form resource planes 40 and 42 with the first resource axis respectively, wherein the two resource axes are corresponding to resources of memory and bandwidth respectively. Further, five first OS graphic objects A, B, C, D and E are generated in the three-dimensional physical machine resource entity 4. Resource graphic objects (depicted as blocks having oblique lines) corresponding to these first OS graphic objects are generated on the resource planes 40 and 42.

Figure 5:
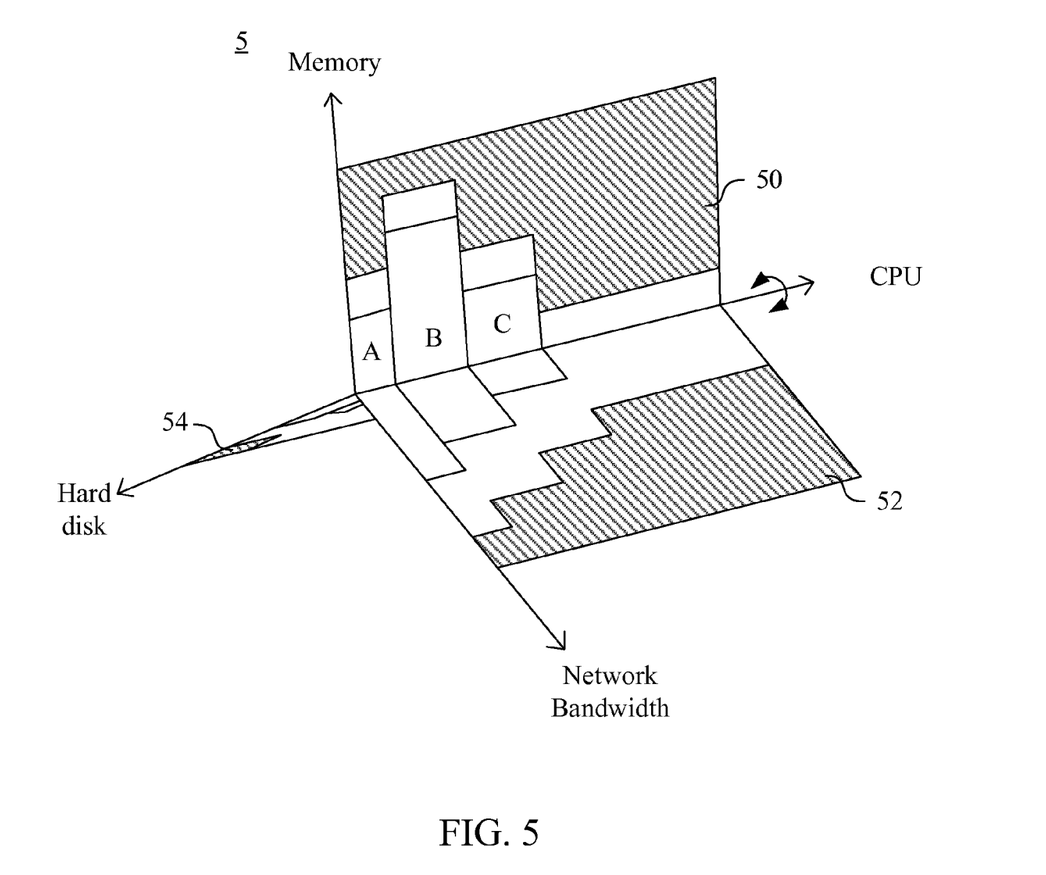
FIG. 5 is a schematic diagram of a four-dimensional physical machine resource entity according to an embodiment of the present disclosure.

FIG. 5 is a schematic diagram of a four-dimensional physical machine resource entity 5 according to an embodiment of the present disclosure. The four-dimensional physical machine resource entity 5 comprises a first resource axis corresponding to a central processing unit and three resource axes that form resource planes 50, 52 and 54 with the first resource axis respectively, wherein the three resource axes are corresponding to resources of memory, bandwidth and hard disk respectively. Further, three first OS graphic objects A, B and C are generated in the four-dimensional physical machine resource entity 5. Resource graphic objects corresponding to these first OS graphic objects are generated on the resource planes 50, 52 and 54. In an embodiment, the four-dimensional physical machine resource entity 5 can be rotated with respect to the first resource axis such that it is easier for the user to observe each of the resource planes 50, 52 and 54.

Figure 6:
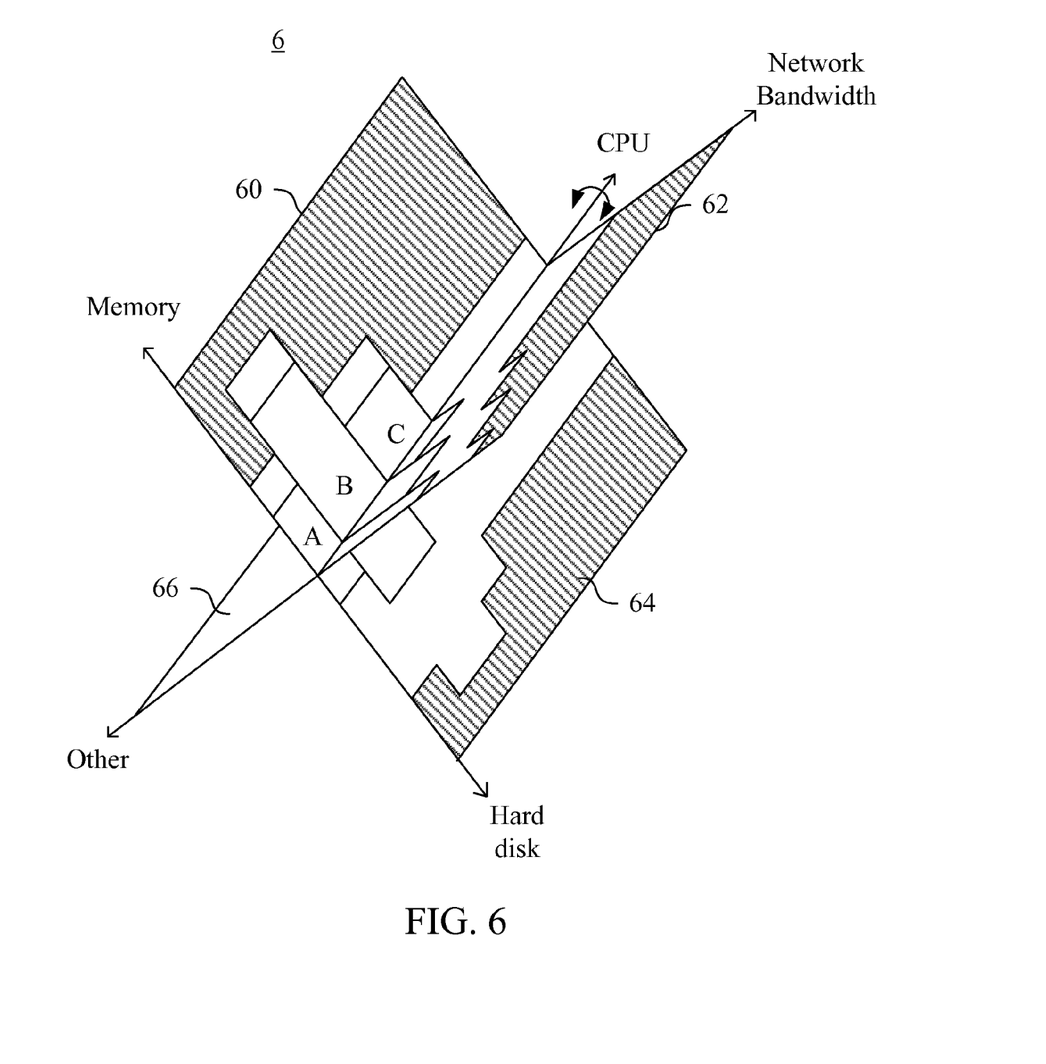
FIG. 6 is a schematic diagram of a five-dimensional physical machine resource entity according to an embodiment of the present disclosure.

FIG. 6 is a schematic diagram of a five-dimensional physical machine resource entity 6 according to an embodiment of the present disclosure. The five-dimensional physical machine resource entity 6 comprises a first resource axis corresponding to a central processing unit, and four resource axes that form resource planes 60, 62, 64 and 66 with the first resource axis respectively, wherein the four resource axes are corresponding to resources of memory, bandwidth, hard disk and other resources respectively. Further, three first OS graphic objects A, B and C are generated in the five-dimensional physical machine resource entity 6. Resource graphic objects (shown by cross-sectional lines) corresponding to these first OS graphic objects are generated on the resource planes 60, 62, 64 and 66. In an embodiment, the five-dimensional physical machine resource entity 6 can be rotated with respect to the first resource axis, such that it is easier for the user to observe each of the resource planes 60, 62, 64 and 66. It is noted that the adjustment of the resource of the multi-dimensional physical machine resource entity can be performed according to the process depicted in FIG. 2 as well, and is not described herein again.

The present disclosure provides a graphic user interface, a system, a method for operating the graphic user interface, and a computer readable storage medium so as to adjust the resource allocation of the virtual machine quickly and intuitively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for operating a graphic user interface, wherein the method is used in a system for operating the graphic user interface, the operation method comprises:
providing an N-dimensional physical machine resource entity in a storage unit of the system such that the N-dimensional physical machine resource entity is displayed on a display unit of the system, wherein the N-dimensional physical machine resource entity comprises:
a first resource axis corresponding to a first resource;
N−1 resource axes intersected with the first resource axis, each of the N−1 resource axes corresponding to a specific resource; and
N−1 resource planes each of which is formed between the first resource axis and one of the N−1 resource axes;
wherein each of the N−1 resource planes comprises a plurality of resource columns extending along an extension direction of the corresponding resource axis, and each of the resource columns comprises a plurality of resource blocks, wherein the number of the resource columns is corresponding to a total amount of the first resource, and the number of the resource blocks of each of the resource columns is corresponding to a total amount of the specific resource;
generating a first OS (operation system) graphic object in the N-dimensional physical machine resource entity by a process unit of the system, wherein the first OS graphic object is disposed in a specific resource column of each of the N−1 resource planes to occupy a specific resource block;

generating a plurality of resource graphic objects by the process unit of the system to occupy one of the resource blocks of each of the resource columns other than the specific resource column; and deforming the first OS graphic object by the process unit of the system to display an amount of usage of the first resource and the specific resource on the display unit of the system such that the number of the resource graphic objects is changed to display a remaining amount of the first resource and the specific resource on the display unit of the system.

2. The method of claim 1, wherein the step of deforming the first OS graphic object further comprises:

stretching or shortening the first OS graphic object in the specific resource column on one of the N−1 resource planes along the extension direction of one of the corresponding resource axes such that the first OS graphic object occupies M resource blocks, and the number of the resource graphic objects are changed to occupy M resource blocks of each of the resource columns other than the specific resource column, wherein M is larger than or equal to one.

3. The method of claim 1, wherein the step of deforming the first OS graphic object further comprises:

stretching or shortening the first OS graphic object along a first extension direction of the first resource axis to occupy P resource columns of each of the N−1 resource planes such that each of the P−1 resource columns other than the specific resource column has the same number of the resource blocks as the number of the resource blocks of the specific resource column.

4. The method of claim 1, wherein the first resource is a central processing unit.

5. The method of claim 1, wherein the specific resource is a hard disk, a network bandwidth resource or a memory.

6. The method of claim 1, wherein the amount of usage of the first resource and the specific resource are displayed as numeric values in the first OS graphic object.

7. The method of claim 1, wherein the step of generating the first OS graphic object further comprises:

dragging a second OS graphic object from outside the N-dimensional physical machine resource entity into the N-dimensional physical machine resource entity to generate the first OS graphic object; and initializing a virtual machine and a resource corresponding to the virtual machine.

8. The method of claim 7, wherein the second OS graphic object is disposed in an operation system list area.

9. The method of claim 7, wherein the second OS graphic object is disposed in another N-dimensional physical machine resource entity.

10. The method of claim 1, further comprising:

dragging the first OS graphic object to outside the N-dimensional physical machine resource entity so as to remove the resource graphic objects corresponding to the first OS graphic object.

11. A system for operating a graphic user interface, the system comprising:

a storage unit for storing an N-dimensional physical machine resource entity, wherein the N-dimensional physical machine resource entity comprises:

a first resource axis corresponding to a first resource, and N−1 resource axes intersected with the first resource axis, each of the N−1 resource axes corresponding to a specific resource; and N−1 resource planes each of which is formed between the first resource axis and one of the N−1 resource axes;

wherein each of the N−1 resource planes comprises a plurality of resource columns extending along an extension direction of the corresponding resource axes, and each of the resource columns comprises a plurality of resource blocks, wherein the number of the resource columns is corresponding to a total amount of the first resource and the number of the resource blocks of each of the resource columns is corresponding to a total amount of the specific resource;

a display unit to display the N-dimensional physical machine resource entity; and a process unit connected to the display unit and the storage unit for generating a first OS (operation system) graphic object in a specific resource column of each of the N−1 resource plane to occupy a specific resource block; for generating a plurality of resource graphic objects to occupy one of the resource blocks of each of the resource columns other than the specific resource column; and for deforming the first OS graphic object to display an amount of usage of the first resource and the specific resource such that the number of the resource graphic objects is changed to display a remaining amount of the first resource and the specific resource.

12. The system of claim 11, wherein when the first OS graphic object is deformed, the first OS graphic object is stretched or shortened in the specific resource column on one of the N−1 resource planes along the extension direction of one of the corresponding resource axes, such that the first OS graphic object occupies M resource blocks, the number of the resource graphic objects are changed to occupy M resource blocks of each of the resource columns other than the specific resource column, wherein M is larger than or equal to one.

13. The system of claim 11, wherein when the first OS graphic object is deformed, the first OS graphic object is stretched or shortened along a first extension direction of the first resource axis to occupy P resource columns of each of the N−1 resource planes, such that each of the P−1 resource columns other than the specific resource column has the same number of the resource blocks as the number of the resource blocks of the specific resource column.

14. The system of claim 11, wherein the first resource is a central processing unit.

15. The system of claim 11, wherein the specific resource is a hard disk, a network bandwidth resource or a memory.

16. The system of claim 11, wherein the amount of usage of the first resource and the specific resource are displayed as numeric values in the first OS graphic object.

17. The system of claim 11, wherein the first OS graphic object is generated by dragging a second OS graphic object from outside the N-dimensional physical machine resource entity into the N-dimensional physical machine resource entity to initialize a virtual machine and a resource corresponding to the virtual machine.

18. The system of claim 17, wherein the second OS graphic object is disposed in an operation system list area.

19. The system of claim 17, wherein the second OS graphic object is disposed in another N-dimensional physical machine resource entity.

20. The system of claim 11, wherein when the first OS graphic object is dragged to outside the N-dimensional physical machine resource entity to remove the resource graphic objects corresponding to the first OS graphic object.

21. A non-transitory computer readable storage medium to store a computer program to execute a method for operating a graphic user interface, wherein the method is used in a system for operating the graphic user interface, the method comprises:
  providing an N-dimensional physical machine resource entity in a storage unit of the system such that the N-dimensional physical machine resource entity is displayed on a display unit of the system, wherein the N-dimensional physical machine resource entity comprises:
    a first resource axis corresponding to a first resource;
    N−1 resource axes intersected with the first resource axis, each of the N−1 resource axes corresponding to a specific resource; and
    N−1 resource planes each of which is formed between the first resource axis and one of the N−1 resource axes;
    wherein each of the N−1 resource planes comprises a plurality of resource columns extending along an extension direction of the corresponding resource axes, and each of the resource columns comprises a plurality of resource blocks, wherein the number of the resource columns is corresponding to a total amount of the first resource and the number of the resource blocks of each of the resource columns is corresponding to a total amount of the specific resource;
  generating a first OS (operation system) graphic object in the N-dimensional physical machine resource entity by a process unit of the system, wherein the first OS graphic object is disposed in a specific resource column of each of the N−1 resource plane to occupy a specific resource block;
  generating a plurality of resource graphic objects by the process unit of the system to occupy one of the resource blocks of each of the resource columns other than the specific resource column; and
  deforming the first OS graphic object by the process unit of the system to display an amount of usage of the first resource and the specific resource on the display unit of the system such that the number of the resource graphic objects is changed to display a remaining amount of the first resource and the specific resource on the display unit of the system.

22. A graphic user interface stored in a storage unit of a system comprising the storage unit, display unit and a process unit, wherein the graphic user interface comprises:
  an N-dimensional physical machine resource entity stored in the storage unit of the system and displayed on the display unit of the system, wherein the N-dimensional physical machine resource entity comprises:
    a first resource axis corresponding to a first resource and N−1 resource axes intersected with the first resource axis, each of the N−1 resource axes corresponding to a specific resource; and
    N−1 resource planes each of which is formed between the first resource axis and one of the N−1 resource axes;
    wherein each of the N−1 resource planes comprises a plurality of resource columns extending along an extension direction of the corresponding resource axes, and each of the resource columns comprises a plurality of resource blocks,
    wherein the number of the resource columns is corresponding to a total amount of the first resource and the number of the resource blocks of each of the resource columns is corresponding to a total amount of the specific resource;
  a first OS (operation system) graphic object generated in the N-dimensional physical machine resource entity by the process unit of the system, wherein the first OS graphic object is disposed in a specific resource column of each of the N−1 resource plane to occupy a specific resource block; and
  a plurality of resource graphic objects generated in each of the N resource plane by the process unit of the system to occupy one of the resource blocks of each of the resource columns other than the specific resource column;
  wherein when the first OS graphic object is deformed by the process unit of the system to display an amount of usage of the first resource and the specific resource on the display unit of the system, the number of the resource graphic objects is changed to display a remaining amount of the first resource and the specific resource on the display unit of the system.

* * * * *